Figure 1:
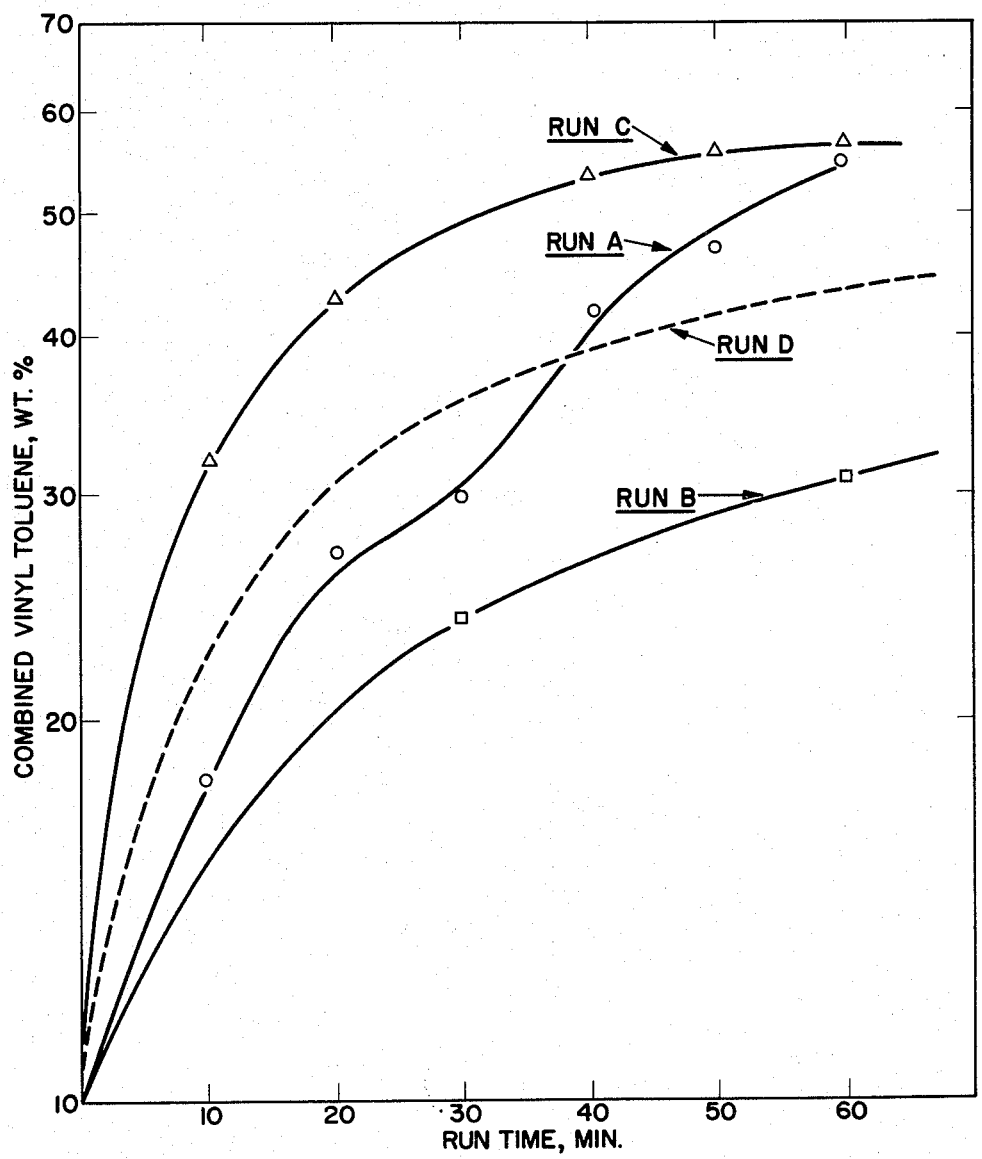
Figure 2:
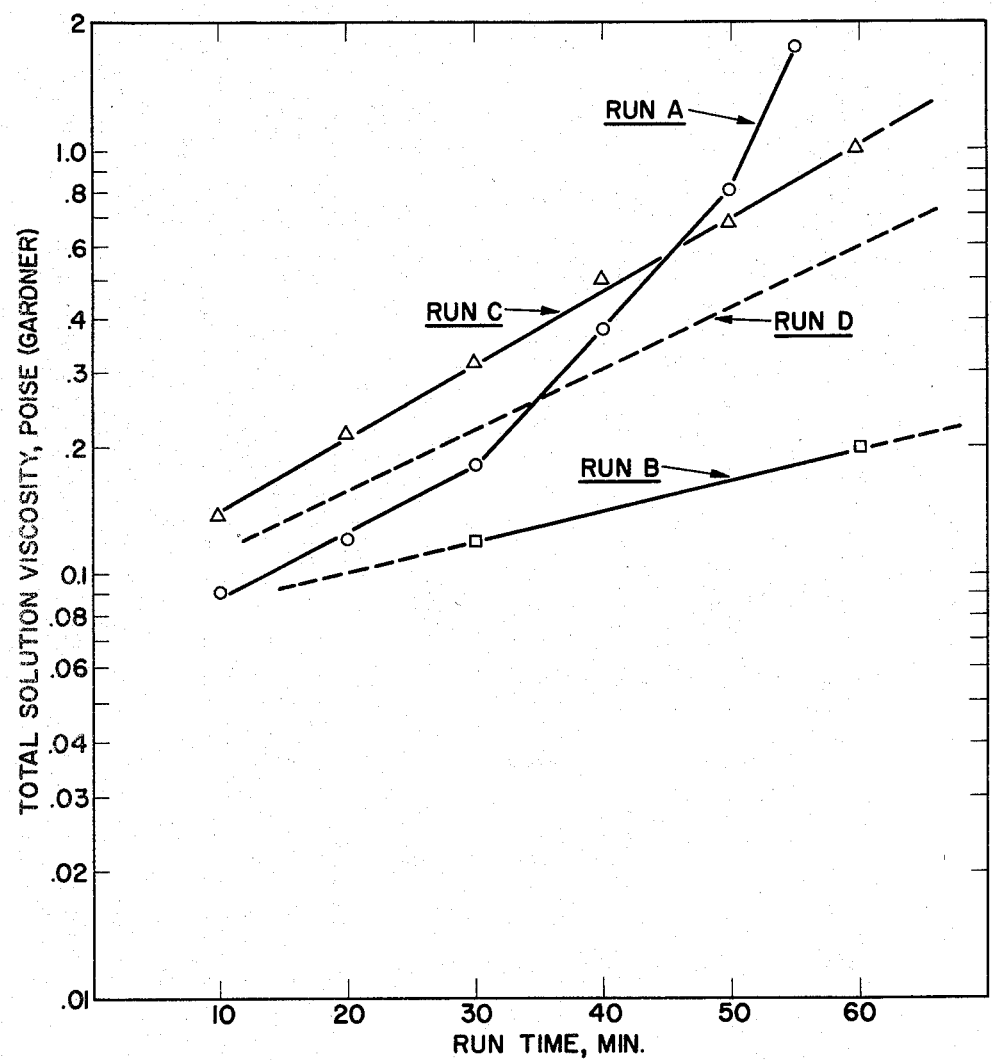

May 25, 1965   R. G. ADAMS ETAL   3,185,659
PROCESS FOR PREPARING A GRAFT POLYMER
Filed Jan. 3, 1961   2 Sheets-Sheet 1

FIG. I

Richard G. Adams
Hadden Clark
William H. Smyers   Inventors

By C. D. Stores   Patent Attorney

United States Patent Office 3,185,659
Patented May 25, 1965

3,185,659
PROCESS FOR PREPARING A GRAFT POLYMER
Richard G. Adams, Montclair, Hadden Clark, Plainfield, and William H. Smyers, Westfield, N.J., assignors to Esso Research and Engineering Company, a corporation of Delaware
Filed Jan. 3, 1961, Ser. No. 80,311
4 Claims. (Cl. 260—33.6)

This invention relates to a polydiolefin graft co-polymer and more particularly it is concerned with the process for providing this graft co-polymer.

It is known to form a resinifiable polymeric mix comprising a curable polydiolefin, a crosslinking monofunctional monomer, e.g., vinyl toluene, a peroxide catalyst, and a difunctional monomer, e.g. divinyl benzene, and subsequently to react this mix in solution with toluene at elevated temperatures to provide a graft co-polymer. A reinforcing element, e.g. paper and cloth, can then be impregnated with this graft co-polymer to form a prepreg which can be subsequently laminated with similar items to provide a reinforced plastic therefrom.

In the past, all of the above components in the mix have been incorporated initially into a reaction zone and heated at elevated temperatures to form the graft copolymer. However, the time required to provide the desired graft co-polymer was relatively long, which is a disadvantage from a commercial standpoint. Thus, in accordance with a first embodiment of the present invention, it has been discovered that the desired graft copolymer can be prepared in a shorter period of time by an incremental addition of catalyst to the components in a reaction zone.

In this invention, there is a second embodiment which is a two-step technique for providing a graft co-polymer to combine a higher quantity, e.g. up to 80%, of crosslinking monomer without gelation occurring therein. In a first step of this embodiment, the polydiolefin and the monofunctional crosslinking monomer, e.g. vinyl toluene, catalyst and solvent, e.g. toluene, are reacted. Then in a second step, a mixture of catalyst and difunctional monomer, e.g. divinyl benzene, is incorporated in the reactor to form the desired graft co-polymer. An alternative method is to heat the polydiolefin with the monomer, e.g., styrene and vinyl toluene, in the presence of catalyst. Then add divinyl benzene and the like and reheat to provide a graft co-polymer with increased viscosity.

A third embodiment herein is to provide a polydiolefin solution which as been preheated to a desired reaction temperature. A mixture of catalyst and crosslinking monomers is then gradually incorporated into the aforementioned solution to form a graft co-polymer therefrom.

A fourth embodiment in the present invention is to employ any combination of the three embodiments heretofore described.

The preferred polymeric oils included in the resinifiable mix of this invention are prepared from diolefins, particularly those which are conjugated and have 4 to 6 carbon atoms per molecule, e.g. butadiene, hexadiene, isoprene, dimethyl butadiene, piperylene, and methyl pentadiene. Diolefins may be used which are copolymerized with minor amounts of ethylenically unsaturated monomers, e.g. styrene, acrylonitrile, methyl vinyl ketone; or with styrenes having alkyl groups substituted on the ring, e.g., paramethyl styrene and dimethyl styrene. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymer of butadiene with styrene. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C. in amounts ranging from 100 to 500 parts per 100 parts of monomers; preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having —O—C—O— grouping; particularly useful ethers are dioxane 1,4 and diethyl ether. Finally, it is beneficial to use about 5 to 35 wt. percent, based on sodium, of an alcohol such as methanol, isopropanol, or an amyl alcohol in order to overcome the initial induction period. The resulting product may vary in viscosity from 0.1 to 20 poises at 50 wt. percent in Varsol. The preparation of this oil in the presence of an alkali metal catalyst is described in U.S. Patent 2,762,851. These polydiene products have a high percentage of side vinyl groups, e.g. 50 to 80%, generally about 60 to 70%. Related, but somewhat inferior polybutadiene oils may be made by a peroxide catalyst as shown in U.S. Patent 2,586,594. These patents are incorporated herein by reference.

Besides the curable polydiolefin just described, and a suitable solvent, e.g. toluene, xylene, etc., this graft polymerization mixture must also contain monomeric crosslinking agents. Such monomers include a vinyl aromatic, such as styrene, vinyltoluene, dimethylstyrene, a halogenated styrene, or vinyl chloride or vinylidene chloride; acrylic and methacrylic acid esters of monohydric alcohols, such as methyl or butyl methacrylate, alkyl fumarates, such as diethyl fumarates; a vinyl ester, such as vinyl stearate; or difunctional crosslinkers, e.g. divinyl benzene, diisopropenyl benzene; allyl esters such as diallyl phthalate; and an arcylic acid ester of a polyhydric alcohol, such as dimethacrylate ester of ethylene glycol; acrylonitrile; and mixtures thereof. These crosslinking agents may be present within the range of 0 to 80% of the curable liquid mix, preferably 30 to 50%.

A catalyst is incorporated in the above graft polymerization mix within the range of 0.1 to 5 parts, preferably 0.2 to 1.0 part, based on total of polydiolefin oil and graft monomer. The catalyst is advantageously a free radical or a peroxide type, such as diaroyl, dialkyl or arylalkyl peroxides, e.g. benzoyl peroxide, dichlorobenzoyl peroxide, lauroyl peroxide, dicumyl peroxide and ditertiary butyl peroxide; alkyl peresters, e.g. ditertiary butyl perphthalate and tertiary butyl perbenzoate; and mixtures thereof. After the graft co-polymerization has been completed, and the solution cooled to room temperature, larger amounts of these peroxides can be added to effect the final cure after glass cloth, paper, etc., have been impregnated with the solution, and dried to remove volatile inert solvents.

It is also advantageous, although optional, to incorporate a hindered, blocked phenol into the aforementioned graft-polymerized impregnating varnish, to prevent curing during drying to evaporate inert solvent. A preferred hindered phenol is 2,6-di-t-butyl-p-cresol which can be employed within the range of 0 to 0.2 part per 100 parts of mix. It is also possible, although not essential to incorporate in this resinifiable mix 0.1 to 5 parts of a silane ester which has a general formula

$$R_nSi(OR_1)_{4-n}$$

wherein R is an unsaturated group, e.g. vinyl, aryl or metharyl group; $n$ is a positive integer equal to 1, 2, or 3; and $R_1$ is an alkyl or aryl group or substitute thereof. A preferred silane ester is vinyl trichlorosilane.

This invention may be more fully understood from the following description of the first embodiment in conjunction with the accompanying drawings. FIGURES I and II show the grafting and thickening results obtained by (A) incrementally incorporating a catalyst into the graft co-polymerization mixture, compared to having less (B), more (C), or the same amount (D), of catalyst all present at the start of the graft co-polymerization reaction.

It should be noted that a graft co-polymer is not the same as a B-stage partial cure and/or a complete cure. The graft co-polymer has only two dimensional crosslinking whereas the B-stage has some three dimensional crosslinking. Furthermore, the graft co-polymer is soluble in hydrocarbon solvents, e.g. toluene, xylene, close-cut naphthas, and Varsol; in contrast, the B-stage is not soluble in these compounds. The comparison of properties of the three stages are demonstrated herebelow:

| Graft co-polymer | B-stage | Complete cure |
| --- | --- | --- |
| Soluble in solvents. Viscosity between 1 and 30 poise at 50% NVM. | Soft gel, swells in solvents and therefore not soluble in solvents. | Hard solid, affected very slightly by, or inert to, solvents. |

In accordance with the first embodiment of the present invention, a batch process is employed for preparing a graft co-polymer. The polydiolefin, e.g. polybutadiene; the crosslinking monofunctional monomer, e.g. vinyl toluene; and difunctional monomer, e.g. divinyl benzene are initially mixed in a solvent, e.g. toluene, xylene, benzene, or suitable mixed solvents. The blend is then fed into the reactor zone. The reaction zone can be a closed batch reactor which is maintained at a temperature between 90 and 300° F. and a pressure sufficient to maintain the reactor contents in liquid form although refluxing may take place. Catalyzation is performed in the instant embodiment, by the incremental addition of the catalyst into the reactor for the period of time which is required to produce the graft co-polymer. This can be accomplished by adding 0.002 to 0.5 part of catalyst per 100 parts of mix per minute for 15 to 180 minutes. The preferred continuous addition of catalyst is .004 to .01 part per minute for 30 to 80 minutes. The surprising effect of this procedure is illustrated in FIGURES I and II (Table I) wherein Run A represents the present embodiment, namely by addition of 0.1 wt. percent of catalyst (BPO) at three 20 minute intervals; Run B shows the addition of 0.1 wt. percent of benzoyl peroxide initially; Run C designates, 0.5 wt. percent initially; and Run D demonstrates, 0.3 wt. percent of catalyst, initially. Furthermore, a graft co-polymer with the desired quantity of combined crosslinking monomer therein can be prepared by using substantially less amounts of catalyst. It should also be noted that for the same amount of catalyst, a graft co-polymer can be provided with a higher amount of combined crosslinking monomeric agent therein. This incremental, continuous addition of catalyst will also improve operability and product quality.

Alternatively, it has been discovered that grafting rates can be improved by maintaining a temperature differential between the polydiolefin feed system and the catalyst feed system. The polydiolefin alone in solution or in combination with a crosslinking monomeric agent and/or a difunctional monomer, e.g. divinylbenzene, is preheated in the reaction zone to a temperature between 90 and 300° F., preferably 200 to 260° F. The catalyst, alone or dissolved in a volatile solvent, e.g. toluene, or xylene, etc., is introduced to the reaction zone at a temperature between room temperature to 150° F., preferably 70 to 100° F. After a reaction time of 15 minutes to 2 or 3 hours, a graft co-polymer is formed. Properties, thereof, depend upon temperature, time, heat transfer and concentration of catalyst, polybutadiene, and graft monomer.

Referring now to the two-step preparation of the graft co-polymer in the second embodiment, 20 to 40% of the polydiolefin, 70 to 30% of the solvent, 10 to 40% of monofunctional crosslinking monomer, e.g. vinyl toluene, styrene, and 0.1 to 1.5% of catalyst are fed to and mixed in a reaction zone. In the first step, the admixture is heated to a temperature between 100 and 150° C. for 10 to 100 minutes to provide the first grafting step. In the second step, 0.05 to 0.5% of catalyst is externally added to 0.5 to 5 parts of difunctional monomer, e.g. divinylbenzene. The mixture therefrom is added to the reactor after the completion of the first step in conjunction with a temperature between 90 and 120° C. for 5 to 60 minutes. The graft product which is formed has at least 40% of crosslinking monomer combined therein, preferably 55 to 75%.

With respect to the third embodiment, 20 to 40%, preferably 25 to 35%, of the polydiolefin, e.g. polybutadiene, and 60 to 80% of solvent, e.g. toluene, are heated at a temperature of 100 to 130° C. to provide a first solution. A second solution can be provided comprising 0 to 20% solvent; 20 to 45%, preferably 25 to 40%, monofunctional crosslinking monomer, e.g. styrene; and 0.1 to 1.5% catalyst, e.g. benzoyl peroxide, and this second solution is added to the first solution within a time range of 5 to 60 minutes with further heating for 0 to 60 minutes. Most or all this catalyst should be dissolved in the styrene, although some of it can be added gradually after the styrene addition has ceased. To the combined solutions, one and two above, is added a third solution which contains therein 0.5 to 5.0% difunctional monomer, e.g. divinylbenzene; and 0.05 to 0.5% of catalyst, e.g. benzoyl peroxide. The temperature is maintained between 90 and 120° C. and the time for the gradual addition of this third solution is between 5 and 30 minutes, preferably 5 and 15 minutes. The catalyst in this third solution is preferably dissolved in the monomer with optional solvent and the solution added gradually as per above, with optional additional heating thereafter of 0 to 20 minutes. Alternatively, the second and third solutions could be combined and added gradually to the first solution.

The reinforcing elements that can be optionally laminated with a graft co-polymer heretofore described include such items as mineral materials, e.g. glass, asbestos, mica, rock, wool, and celite; vegetable materials, e.g. cotton, linen, rayon, paper, sisal, and silk; organic materials, e.g. hair, nylon, and orlon; and metallic materials, e.g. iron, aluminum, and copper. Reinforcing elements may comprise 10 to 90% by weight of the reinforced plastic, preferably 35 to 80%. However, the preferred materials are paper, glass fiber and cloth. In accordance with this invention, glass fiber is defined as any fibrous glass unit to include filament yarns, rovings, reinforcing mats, staple yarns, woven fabrics, and milled fibers. A protective size may be applied to glas fibers, e.g. polyvinyl acetate and rubbery polymers. It is within the scope of this invention to use glass fiber which has been treated with an unsaturated organic halo silane, having the formula $R_nSiX_{4-n}$, wherein R is vinyl or allyl group, $n$ is a positive integer equal to 1, 2 or 3, and X is halogen, e.g. vinyl trichlorosilane.

The reinforcing agent can be laminated as per the instant invention with the resinifiable polymer mix which has been reacted to provide the graft co-polymer. A laminate, according to this invention, is defined as a composite mass of a reinforcing element and a thermosetting resin. This, therefore, includes flat layers of paper, or cloth and resin laminated into a rigid panel; cloth embedded in a resin; and fibers saturated with resin and formed in a hollow cylindrical pipe. Accordingly, impregnation can be accomplished by any known method, e.g. the graft co-polymer can be combined with paper by immersion or by brush impregnation; or on a continuous web impregnating machine.

In accordance with the preferred open mold technique, the reinforcing element, e.g. paper and/or glass cloth, or glass yarns or rovings is impregnated with the graft co-polymer and dried in an air circulating oven at a temperature of room temperature to 325° F. for 30 seconds to 2 hours, e.g. 4 minutes at 250° F. A prepreg is obtained therefrom which is not tacky and is adaptable for winding up into rolls for storage or shipment, or for being laminated in an open mold to provide a reinforced plastic therefrom. Depending upon the conditions employed this prepreg can be a dried graft co-polymer, e.g. with a temperature of 250° F. and below, or may be advanced to a B-stage with additional catalyst and/or higher temperatures. Accordingly, this prepreg is then laminated with similar items. Thus, one method used in the manufacture of solid rectangular sheets, is to form layers of the reinforcing element, e.g. paper, with the dried graft co-polymer thereon and to cure these layers in a hot press. Another method can be used for the manufacture of cylindrical hollow pipes wherein glass fibers, with the polymeric mix partially cured thereon, can be wound about a steel mandrel, e.g. at an angle to the axis of the mandrel circumferentially in superimposed layers, to form a peripheral shell of the pipe.

The laminated items are subsequently subjected to a final cure to provide a hard, solid reinforced plastic. This can be accomplished in an open flash technique (open mold) by employing a temperature between 280° and 450° F. for between 30 seconds and 2 hours with a pressure between 0 and 5000 p.s.i. Open mold curing is entirely different from a closed mold technique. In an open mold, the material is not contained therein, for example, in an open flash technique the retaining sides are absent from the molding device, and excess resin is free to squeeze out from between the glass cloth or paper layers. A closed mold completely contains the material being cured. A complete cure can be accomplished by heating an impregnated reinforcing element in a mold at a temperature between about 300° and 400° F. for 1 hour to 5 minutes, e.g. 30 minutes at 335° F. to provide a laminate therefrom.

In commercial operations, the graft co-polymer heretofore described may be called an impregnating varnish since the graft co-polymer can be employed to impregnate glass cloth or paper substrate. Mold release agents may be included in the graft co-polymer and are generally metallic soaps, e.g. calcium stearate. The viscosity of the graft co-polymer solution can be reduced by adding hydrocarbon solvents, e.g. toluene, or can be increased by incorporating fillers. It is necessary to add 0.5 to 10 parts of curing catalyst, preferably about 1.0 to 5.0 phr. (parts per 100 of resin solids), to the graft co-polymer solution just before it is used to impregnate a reinforcing element. If paper is being employed as a reinforcing element it can be pretreated with 5 to 15% of water soluble thermosetting resins, e.g. phenolic and melamine resins. Stabilizers, curatives, dyes, pigments and/or other additives can be mixed into the graft co-polymer before or after it is recovered from the solvent. One method to recover the graft co-polymer is to mix the effluent from the reactor with polar solvent which is miscible with toluene, e.g. alcohol, such as ethyl alcohol. The graft co-polymer precipitates therefrom and after filtering and drying it can be redissolved in naphtha and commercially marketed in this form. It is also noted that residual polymerization occurs even after catalyst addition has been terminated and cooling begun. A method for controlling graft co-polymer properties is to add tertiary butyl catechol or similar agents to react with the free radical generator.

Within the purview of this invention, is the technique of providing a hard, solid resin from the present graft co-polymer without any reinforcing element therein. Generally the curing techniques heretofore described for laminates can be employed in this concept.

Thus, in accordance with the instant invention, it is now possible to obtain a graft co-polymer as shown herebelow.

PROPERTIES OF THE GRAFT CO-POLYMER

| Solution | Broad | Preferred |
|---|---|---|
| Solids, wt. percent[a] | 40–60 | 55–57 |
| Viscosity at 55% solids, stokes[b] | 1–40 | 2–10 |
| Appearance, visual | Clear and substantially free from insoluble homo-polystyrene or the like—single phase. | |
| Polymer characteristics: | | |
| Polydiolefin content, wt. percent[c] | | 58–60 |
| Intrinsic viscosity[d] | | 0.17–0.24 |
| Refractive index at 25° C[e] | | >1.55 |
| Re Monomers: | | |
| Utilization thereof (wt. percent) | 50–80 | 60–75 |
| Monofunctional content (wt. percent)[f] | 10–60 | 35–45 |
| Difunctional content (wt. percent)[g] | 0–10 | 1–5 |

[a] Determined as 0.5 gram sample topped with .5–1 gram toluene prior to drying in vacuum oven at 150° C. for 30 minutes.
[b] Gardner viscosity at 25° C.
[c] Calculated from polymerization data.
[d] Determined on precipitated polymer using 10 mg./cc. toluene; see SIL 350.24A.
[e] Determined on dried film, cast from toluene solution of precipitated polymer. Polymer composition is calculated using the following formula:

$$RI_{25°C.} = 1.56804 - 0.00049\ PB + 0.0057\ C.$$

wherein PB is wt. percent polybutadiene in graft polymer and C is wt. percent benzoyl peroxide based on styrene used.
[f] In solvent free polymer, e.g. styrene.
[g] In solvent free polymer, e.g. divinylbenzene.

The following examples are submitted to illustrate but not to limit this invention. Unless otherwise indicated, all parts and percentages in this specification are based upon weight.

*Example I*

A polymeric oil was provided from the following compounds: butadiene-1,3, 100 parts; Varsol (straight run mineral spirits, API gravity, 49.0, flash, 105° F., boiling range, 150 to 200° C., solvent power, 33–37 butanol value), 200 parts; dioxane, 40 parts; isopropanol, 0.2 part; sodium (dispersed particle size of 10 to 50 microns), 1.5 parts. The polymerization was performed at 50° C. in a two-liter autoclave equipped with a mechanical agitator. The resulting product, which is a polybutadiene oil, had a viscosity of 1.0 poise at 50% NVM in Varsol solution and the non-volatile portion thereof had an average molecular weight of about 7000.

One hundred parts of the above polybutadiene were incorporated into a reactor in conjunction with 100 parts of vinyl toluene and 4 parts of divinyl benzene and 200 parts of toluene. In order to provide the graft co-polymer, benzoyl peroxide (BPO) as a catalyst was also included therein. The catalyst was added in varying amounts either initially or in increments during the formation of the graft co-polymer as indicated in Table I.

As demonstrated by FIGURE I and Table I, superior results heretofore referred to in conjunction with FIGURE I are obtained in Run A wherein 0.1 wt. percent of catalyst is incorporated in three 20-minute intervals for 60 minutes, making a total of 0.3% catalyst, as compared with Run D, in which 0.3 wt. percent was incorporated in the reactor initially.

Thus, at 55-minute run time, Run A, representing the present invention had resulted in 55% of vinyl toluene (VT) reacted, whereas Run D only had 44% at the 60-minute time. Run D would probably gel before reaching 55% combined vinyl toluene. Another, though less striking advantage, is that when Run A had 42% combined VT (at 40 minutes), the viscosity was only 0.38 poise, whereas when Run D reached 42% combined VT, the viscosity was 0.42 poise.

TABLE I

| Run No. | A | | | B | | | C | | | D | | |
|---|---|---|---|---|---|---|---|---|---|---|---|---|
| Catalyst added a | 0.1 wt. percent at 20 min. intervals | | | 0.1 wt. percent at Start | | | 0.5 wt. percent at Start | | | 0.3 wt. percent at Start | | |
| Run time, min. | Visc., poise | Sol. NVM, wt. percent | Vinyl toluene combined, wt. percent | Visc., poise | Sol. NVM, wt. percent | Vinyl toluene combined, wt. percent | Visc., poise | Sol. NVM, wt. percent | Vinyl toluene combined, wt. percent | Visc., poise | Sol. NVM, wt. percent | Vinyl toluene combined, wt. percent |
| 10 | (0.1 wt. percent BPO at start) 0.09 | 33.5 | 18 | | | | .14 | 36.4 | 32 | 0.11 | 34.6 | 23 |
| 20 | 0.12 | 35.4 | 27 | | | | .22 | 38.6 | 43 | 0.16 | 36.2 | 31 |
| 30 | (0.1 wt. percent BPO at 20 min.) 0.18 | 36.0 | 30 | .12 | 34.8 | 24 | .32 | 39.0 | 45 | 0.22 | 37.2 | 36 |
| 40 | 0.38 | 38.3 | 42 | | | | .50 | 40.8 | 54 | 0.31 | 37.8 | 39 |
| 50 | (0.1 wt. percent BPO at 40 min.) 0.80 | 39.4 | 47 | | | | .68 | 41.2 | 56 | 0.42 | 38.4 | 42 |
| 55 | 1.74 | 41.0 | 55 | | | | | | | | | |
| 60 | | | | .20 | 36.2 | 31 | 1.00 | 41.4 | 57 | 0.60 | 38.8 | 44 | a Temperature of 115° C.

*Example II*

A graft co-polymer was prepared as follows: in the first step, 300 grams of polybutadiene as described in Example I and 300 grams vinyl toluene were heated in a reactor with 150 grams xylene and 250 grams toluene as solvents at a temperature of 133° C. Six grams of benzoyl peroxide in xylene solution were added dropwise thereto at a rate of 0.24 gram per min. After twenty-five minutes the mixture was cooled to 105° C. The non-volatile material in the mix had increased from the initial 30% to 50.3% and the Gardner viscosity was 7.50 poise.

In the second step, 12 grams of 60% divinylbenzene and 1.5 grams of benzoyl peroxide were added to the reaction mix. The reaction temperature was maintained at 105°–110° C. for 15 minutes. The product therefrom showed no indication of gel and the non-volatile material was increased to 52.4% and the viscosity was 22.7 poise.

The increase in non-volatile material from 30% to 52.4% indicated that approximately 69% of the volatile vinyl toluene and divinylbenzene was combined therein, in a non-volatile form.

*Example III*

Nine hundred grams of polybutadiene (Example I) and 900 grams of styrene were heated in a reactor at a temperature of 128° C. with 600 grams xylene and 600 grams toluene. To this was added, dropwise, at a rate of 1.2 grams per min., 18 grams of benzoyl peroxide in xylene solution. After 30 minutes the mixture was cooled to 105° C. The non-volatile material was increased from the initial 30% to 48% and the Gardner viscosity was 6.03 poise in this first step.

In a second step, 36 grams of 60% divinylbenzene and 2.25 grams benzoyl peroxide were added. The temperature was held between 105° and 107° C. for 15 minutes. The non-volatile material therein was 49.7% and the viscosity was 11.8 poise. This increase indicated that 62% of the volatile monomer was reacted.

*Example IV*

For comparison, a complete one-step process for forming a graft co-polymer was employed wherein 2720 grams of polybutadiene were heated with 2270 grams of xylene and 2270 grams of toluene at a temperature of 125° C. Then, 1820 grams of vinyl toluene, 90 grams of 60% divinylbenzene and 4.5 grams of benzoyl peroxide were incorporated therein. After 66 minutes at 125° C. the product had a viscosity of 1.3 poise and contained 36.1% non-volatile material.

The increase in non-volatile material from the initial 30% to 36.1% indicated that only 29% of the volatile monomers was combined therein which was a relatively lower percentage.

*Example V*

A graft co-polymer was prepared as follows: 360 grams of the copolymer of 80% butadiene with 20% styrene prepared similarly to the homopolymer of Example I was reacted with 240 grams of vinyl toluene and 24 grams of 60% divinylbenzene in the presence of 6 grams benzoyl peroxide, 300 grams toluene, and 300 grams xylene. The reaction was carried out at 128° C. After 18 minutes, the mixture gelled and the gelled product was unusable.

This demonstrated the disadvantage of utilizing a one-step process for providing a graft co-polymer.

*Example VI*

The product of Examples II and III were impregnated on fiberglass cloth and dried 4 minutes at 250° F. and a tack-free prepreg resulted therefrom. The product of Example IV was impregnated on fiberglass cloth under the same conditions but a tacky prepreg was provided therefrom.

It is manifest that this two-step process for preparing a graft co-polymer results in a superior prepreg or laminate.

*Example VII*

Four graft co-polymerization runs were conducted as demonstrated herebelow:

Materials used: Parts by wt.
  Polybutadiene (PBD) per Example I _____ 100
  Diluent (toluene) _____ 130–180
  Styrene a _____ 100
  Divinylbenzene _____ 4
  Benzoyl peroxide _____ 0.1–1.25
Conditions employed:
  Temp. of graft co-polymerization ___° C__ 105–130
  Length of runs _____min__ 75–140 a Except Run B where 67 parts of vinyl toluene were employed in lieu thereof.

| Run | Control a | A | B | C |
|---|---|---|---|---|
| Duration (minutes) of adding monomers | b 0 | 43 | 60 | 15 |
| Percent of total catalyst with monomers | 0 | 100 | 80 | 48 |
| Percent of total catalyst after monomers | 100 | 0 | 20 | 52 |
| Amt. of cat. used (phr.) | 0.5 | 0.1 | 1.25 | 1.25 |
| Product appearance | Cloudy | Clear | Clear | Clear |
| Percent monomer in graft polymer | 38 | 18.5 | 35.5 | 42.6 |
| Percent monomer utilization | 59 | 34 | 50 | 74 | a All monomer in reactor at start.
b All monomer mixed with PBD at start of reaction.

It should be noted that Runs A, B, and C, as per this invention provide end products which are all clear, whereas the "control" is cloudy. Run C is preferred since it has the highest percent graft (42.6) and the high percent monomer utilization (74%).

Example VIII

A combination of the processes described above can be employed as the preferable commercial method to prepare the graft polymer.

Table A herebelow indicates a highly satisfactory process for providing the instant graft polymer:

TABLE A.—CONDITIONS FOR THE TWO-STAGE PREPARATION OF THE GRAFT POLYMER

*Materials (based on 100 pounds total reactor charge)* [a]

Solution A:
- Polybutadiene _____ 30
- Toluene _____ 35

Solution B:
- Styrene _____ 35
- Benzoyl peroxide _____ .7

Solution C:
- Divinyl benzene _____ 1.3

Solution D:
- 5–9 wt. percent benzoyl
- Peroxide in toluene

Stage 1:
- Step 1 ____ Add Solution A to reactor and heat to 115° C.
- Step 2 ____ Maintaining temperature at 115° C., add solution B over a 15-minute period. Continue at 115° C. for an additional 20 minutes (a total of 35 minutes).
- Step 3 [b] ___ Cool reactor contents rapidly to below 90° C. and add solution C.
- Step 4 [b] ___ Heat ractor content to 100° C.
- Step 5 ____ Holding the temperature at 100°, add solution D so that the rest of benzoyl peroxide addition will be 0.005 wt. percent per minute based on total weight of reactor contents at the start of solution D addition. Add solution D for a total of 30 minutes.
- Step 6 ____ Cool reactor contents rapidly to 40° C. or lower. Add 0.2 wt. percent PX 441 (Based on polybutadiene+styrene in feed) [c].

Final Product:
- NVM, wt. percent _____ 48–50
- Gardner vis., stoke _____ <3
- PB in product, wt. percent _____ 58–60
- Precipitated polymer:
    - Appearance _____ White powder
    - RI$_{25°\,C.}$ _____ >1.55

[a] All materials used on an "as received" basis.
[b] These two steps optionally can be combined by merely cooling from 115° C. to 100° C.
[c] 2,6-di-t-butyl-p-cresol.

Typical runs are shown in Table B in which the preferred process as per Table A were employed therein:

TABLE B

| Total feed composition:[a] | Wt. percent |
|---|---|
| Polybutadiene (PB), 0.8 stoke | 30 |
| Styrene | 35 |
| Benzoyl peroxide (On styrene) | 2 |
| Toluene | 35 |
| Divinyl benzene (On PB plus styrene) | 2 |

| Stage No. | 1 | 1 | 1 | 2 | 2 | 2 | 2 | 2 |
|---|---|---|---|---|---|---|---|---|
| Reactor temp., ° C. | 115 | 115 | 115 | 100 | 100 | 100 | 100 | 100 [b] |
| Sample No. | 1 | 2 | 3 | 4 | 5 | 6 | 7 | 8 |
| Run time, minutes | 15 | 25 | 35 | 0 | 10 | 20 | 30 | ---- |
| Benzoyl peroxide (BPO) | [c] | [c] | [c] | [d] | [d] | [d] | [d] | [d] |
| Solids, wt. percent | 39.8 | 44.8 | 46.4 | 46.2 | 47.1 | 48.5 | 49.7 | 49.4 |
| Gardner vis., stokes | 0.20 | 0.58 | 0.98 | 1.02 | 1.17 | 1.50 | 2.50 | 2.75 |
| Styrene utilization, wt. percent | 28 | 42 | 47 | 49 | 53 | 58 | 63 | 62 |
| Polybutadiene in polymer, wt. percent | 75 | 67 | 65 | 64 | 62 | 60 | 58 | 58 |

[a] In Table A for run procedure.
[b] Sample taken after reactor cooled to room temperature.
[c] 2 wt. percent BPO based on styrene added with styrene in first 15 minutes of run.
[d] BPO added at rate of 0.005 wt. percent per minute based on total reactor volume.

Having set forth the general nature and specific embodiments of the present invention the true scope is now particularly pointed out in the appended claims.

What is claimed is:

1. A process of preparing a graft copolymer solution which comprises adding a solution of a peroxide catalyst in a monovinyl monomeric crosslinking agent over a 15 minute period to a solution of an oily liquid polymer of a $C_4$ to $C_6$ conjugated diolefin in a hydrocarbon solvent maintained at a temperature of about 115° C. and maintaining said temperature for an additional 20 minutes, cooling the solution to about 100° C. and while at said temperature, adding a divinyl monomeric compound, followed by an additional amount of a peroxide catalyst dissolved in a hydrocarbon solvent, over a 30 minute period, cooling the admixture to a temperature of no more than about 40° C. and stripping sufficient hydrocarbon solvent from the resultant solution to obtain a final solution of between about 40 and 60 wt. percent nonvolatile material.

2. A process of preparing a graft copolymer solution which comprises adding a solution of benzoyl peroxide in styrene over a 15 minute period to a solution of polybutadiene oil in toluene, maintained at a temperature of about 115° C. and maintaining said temperature for an additional 20 minutes, cooling the solution to about 100° C. and while at said temperature adding divinyl benzene followed by an additional amount of benzoyl peroxide, dissolved in toluene, over a 30 minute period, cooling the admixture to a temperature of no more than about 40° C., adding a 2,6 ditertiary alkyl phenol and stripping sufficient toluene from the resultant solution to obtain a final solution having between about 48 and 50% nonvolatile matter.

3. A process of preparing a graft copolymer solution which comprises adding a solution of a peroxide catalyst in a monovinyl monomeric crosslinking agent over a 5 to 60 minute period to a solution of an oily liquid copolymer of a $C_4$ to $C_6$ conjugated diolefin in a hydrocarbon solvent maintained at a temperature of about 100 to 130° C. and maintaining said temperature for an additional 0 to 60 minutes and while at said temperature adding a divinyl monomeric compound followed by an additional amount of a peroxide catalyst dissolved in a hydrocarbon solvent over a 5 to 30 minute period.

4. A process of preparing a graft copolymer solution which comprises adding a solution of benzoyl peroxide in vinyl toluene over a 5 to 60 minute period to a solution of polybutadiene oil in toluene maintained at a temperature of about 100 to 130° C. and maintaining said temperature for an additional 0 to 60 minutes and while at said temperature adding divinyl benzene followed by an additional amount of benzoyl peroxide dissolved in toluene over a 5 to 30 minute period.

References Cited by the Examiner

UNITED STATES PATENTS

| 2,939,852 | 6/60 | Schmidle | 260—45.5 |
| 3,018,266 | 1/62 | Lundberg | 260—45.5 |
| 3,055,859 | 9/62 | Vollmert | 260—45.5 |

FOREIGN PATENTS

| 767,642 | 2/57 | Great Britain. |

LEON J. BERCOVITZ, *Primary Examiner.*

D. ARNOLD, J. A. SEIDLECK, *Examiners.*